United States Patent
Malecha et al.

(10) Patent No.: US 12,384,280 B2
(45) Date of Patent: Aug. 12, 2025

(54) DEVICE FOR CONSTRAINING ACTUATOR MOTION DURING A DYNAMIC EVENT

(71) Applicant: B/E Aerospace, Inc., Winston-Salem, NC (US)

(72) Inventors: Jeremy F. Malecha, Pfafftown, NC (US); Chad K Hatch, Winston-Salem, NC (US); Conner A. Christensen, Winston-Salem, NC (US); Tony E. Dalton, Statesville, NC (US); Sachin Tarlekar, Greensboro, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 169 days.

(21) Appl. No.: 17/963,515

(22) Filed: Oct. 11, 2022

(65) Prior Publication Data
US 2024/0116415 A1   Apr. 11, 2024

(51) Int. Cl.
*B60N 2/427* (2006.01)
(52) U.S. Cl.
CPC ................ *B60N 2/42745* (2013.01)
(58) Field of Classification Search
CPC .................................................. B60N 2/42745
See application file for complete search history.

(56) References Cited

U.S. PATENT DOCUMENTS

| | | | |
|---|---|---|---|
| 10,654,378 B2 | 5/2020 | Pons | |
| 2018/0237142 A1* | 8/2018 | Malligere | B60N 2/42745 |
| 2022/0250751 A1 | 8/2022 | Aubrun et al. | |
| 2024/0092488 A1* | 3/2024 | Hoover | B60N 2/42736 |

FOREIGN PATENT DOCUMENTS

| | | | |
|---|---|---|---|
| DE | 10044851 A1 | 6/2002 | |
| DE | 102012107036 A1 | 2/2014 | |
| DE | 102012019810 A1 | 4/2014 | |
| DE | 102018119702 A1 | 2/2020 | |
| EP | 0581592 A1 * | 2/1994 | B60N 2/42745 |
| GB | 2434170 B | 12/2008 | |
| WO | 2021048206 A1 | 3/2021 | |

OTHER PUBLICATIONS

European Patent Office, Extended European Search Report received in EP Application No. 23201921.6, May 28, 2024, 11 pages.
European Patent Office, Partial European Search Report received in EP Application No. 23201921.6, Feb. 20, 2024, 13 pages.

* cited by examiner

*Primary Examiner* — Anthony D Barfield
(74) *Attorney, Agent, or Firm* — Suiter Swantz IP (57) ABSTRACT

A device for constraining rotational motion of an actuator such as a seat actuator during a dynamic event. The device includes a first part attachable to a fixed frame member and carrying a first clip, and a second part attachable to an actuator and carrying a second clip. Prior to and following a dynamic event sufficient to cause actuator rotational motion the first clip and the second clip are disengaged. During the dynamic event the second clip is configured to engage the first clip to momentarily stop rotational motion of the actuator such that load on the actuator passes through the actuator shaft into the frame. In embodiments, the device is configured to minimize actuator deformation during a dynamic event while allowing a full range of standard motion during normal use of the actuator.

4 Claims, 13 Drawing Sheets

DEVICE FOR CONSTRAINING ACTUATOR MOTION DURING A DYNAMIC EVENT

TECHNICAL FIELD AND BACKGROUND

The present disclosure relates generally to devices for reducing component deformation during a dynamic event, and more particularly to devices for constraining actuator motion during a dynamic event to minimize actuator deformation.

Passenger seats such as aircraft passenger seats commonly include actuators for changing seat component angles as well as driving seat component extension and translation. For example, actuators may be used to drive seat back recline, leg rest deployment, leg rest extension, lateral seat motion, etc.

Figure 1A:
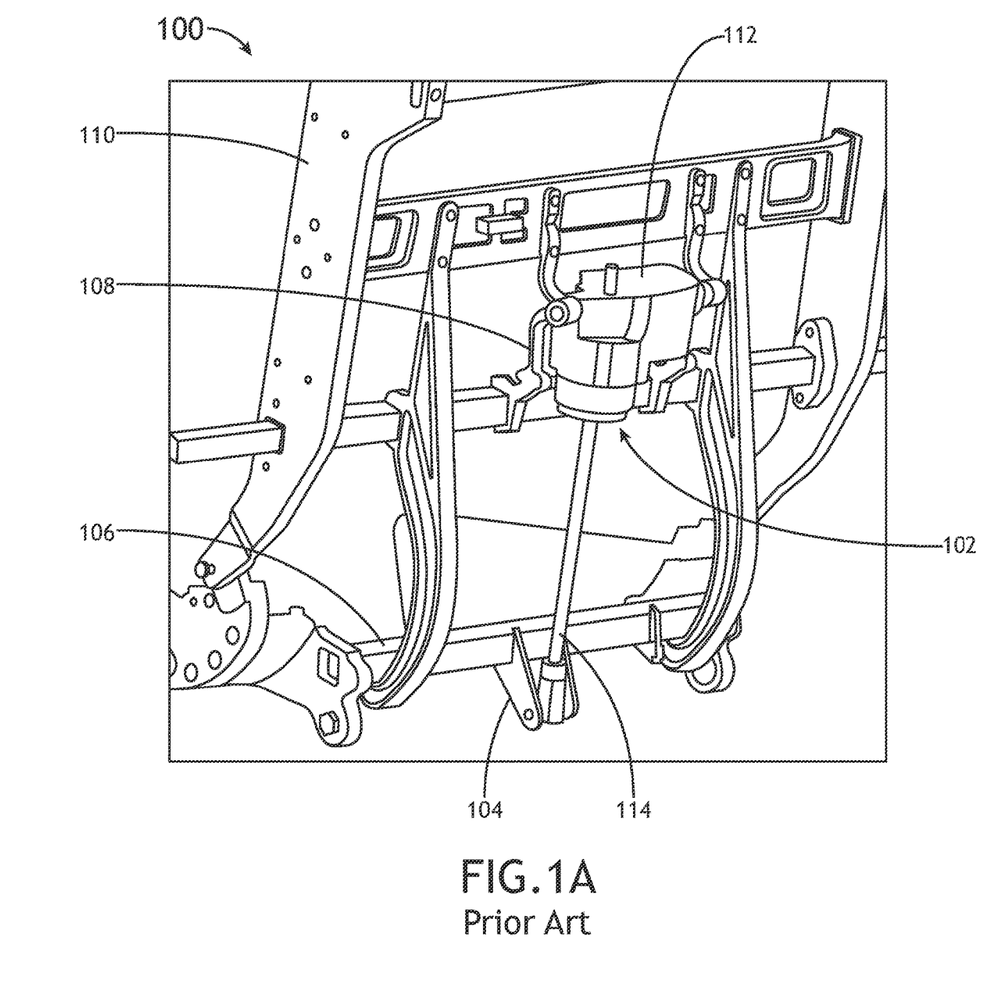
FIG. 1A illustrates a perspective view of a prior art seat frame including an actuator configured to drive seat back recline.

Referring to FIG. 1A, an exemplary business class passenger seat frame 100 may include a linear actuator 102 configured to drive seat back recline. The actuator 102 is shown coupled at one end to a frame member 104 located in the seat pan 106 and at an opposing end to a frame member 108 located in the seat back 110. A stepper motor 112 is energized to drive rotation of a lead screw 114 or shaft, terms which are considered synonymous for purposes of this disclosure.

In use, rotating the lead screw 114 in a first direction causes the seat back 110 to pivot forward to incline the seat back, whereas rotating the lead screw 114 in a second direction, opposite the first direction, causes the seat back 110 to pivot rearward to recline the seat back 110. In some embodiments, the seat back 110, under the control of the actuator 102, may adjust between an upright sitting position for taxi, takeoff, and landing (TTOL) and a fully reclined position during flight, through various intermediate sitting positions.

Figure 1B:
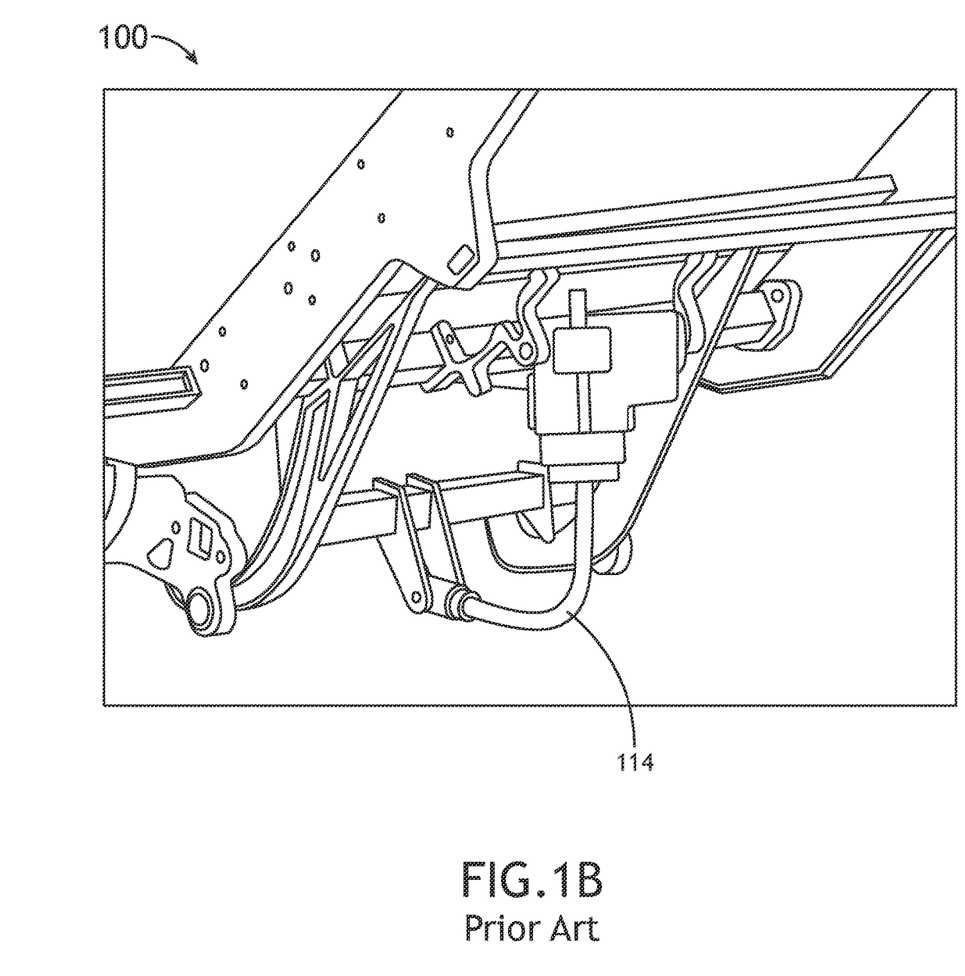
FIG. 1B illustrates a perspective view of the prior art seat frame of FIG. 1 following dynamic event testing.

During normal use of the seat 100, forces on the seat frame and actuator 102 are insufficient to cause component deformation. During a dynamic event, for instance during a high g-force event in which a seat back travels forward past the TTOL position, forces on the seat frame and actuator 102 may be sufficient to cause component deformation. For example, during a high g-force event test on the seat 100, the present inventors found that the seat back 110 initially surges forward past upright followed by an abrupt rebound rearward. During rebound, forces on the actuator shaft were sufficient to cause significant buckling of the lead screw 114 as shown in FIG. 1B. Such buckling may position the deformed lead screw 114 into the egress space behind the seat, thereby resulting in dynamic test failure of the seat.

Therefore, what is needed is a solution for allowing an actuator to suffer a higher load during a dynamic event without significantly deforming, and while allowing a full range of standard motion during normal use.

BRIEF SUMMARY

In one aspect, the present disclosure provides a device for constraining rotational motion of an actuator during a dynamic event such as a high g-force event. The device includes a first part attachable to a frame member such as a seat pan frame member. The first part carries a first clip. The device further includes a second part attachable to an actuator proximate one end of the actuator. The second part carries a second clip. In use, prior to and following a dynamic event sufficient to cause actuator rotational motion, the first clip and the second clip are disengaged. In use, during the dynamic event sufficient to cause actuator rotational motion, the second clip is configured to engage the first clip to momentarily stop rotational motion of the actuator, for instance during rebound motion.

In some embodiments, the first part includes an opening configured to receive a transverse frame member therethrough and a mechanical stop configured to limit rotational motion of the actuator in a forward direction.

In some embodiments, the first clip includes a first hook extending in a first direction, the second clip includes a second hook extending in a second direction opposite the first direction, and the first and second hooks are configured to pass each other during the dynamic event sufficient to cause actuator rotational motion. For example, in use, the second hook may move past the first hook during a first rotational movement of the actuator and the first and second hooks may momentarily engage during a second rotational movement of the actuator, wherein the first and second rotational movements are in opposite directions.

In some embodiments, the second part includes an annular collar configured to be received around a shaft of the actuator, and the second hook is formed on a radial extension of the annular collar.

In some embodiments, the dynamic event sufficient to cause actuator rotational motion is an event of predetermined magnitude, for instance at least a 2 g-force event, at least a 12 g-force event, at least a 16 g-force event, or at least a 20 g-force event.

In another aspect, the present disclosure provides a passenger seat including a seat pan and a seat back rotationally coupled to the seat pan. An actuator coupled at a first end to the seat pan and at a second end to the seat back is operable to control rotational motion of the seat back relative to the seat pan. The actuator includes a shaft. A device configured to constrain rotational motion of the actuator during a dynamic event includes a first part attached to the seat pan carrying a first clip and a second part attached to the actuator proximate the first end and carrying a second clip. Prior to and following a dynamic event sufficient to cause actuator rotational motion the first clip and the second clip are disengaged. During a dynamic event sufficient to cause actuator rotational motion the second clip is configured to engage the first clip to momentarily stop rotational motion of the actuator such that load on the actuator can pass to the seat frame.

In some embodiments, the first part includes an opening receiving a transverse frame member of the seat pan therethrough, and a mechanical stop configured to limit rotational motion of the actuator in a forward direction relative to the seat pan.

In some embodiments, the first clip includes a first hook extending in a first direction, the second clip includes a second hook extending in a second direction opposite the first direction, and the first and second hooks are configured to pass each other as the actuator rotates in a forward direction of the seat pan during the dynamic event sufficient to cause actuator rotational motion.

In some embodiments, the second part includes an annular collar configured to be received around the shaft of the actuator, and the second hook is formed on a radial extension of the annular collar.

In some embodiments, the dynamic event sufficient to cause actuator rotational motion is an event of magnitude sufficient to cause deformation to a seat element.

In some embodiments, the actuator is a linear actuator including a stepper motor and a lead screw, wherein the second clip surrounds a portion of the lead screw.

In a further aspect, the present disclosure provides a passenger seat including a seat pan including a transverse frame member and a seat back rotationally coupled to the seat pan. An actuator coupled at a first end to the seat pan and at a second end to the seat back is operable to control rotational motion of the seat back relative to the seat pan. The actuator includes a shaft. The seat further includes a device configured to constrain rotational motion of the seat back during a dynamic event. The device includes a brace pivotally attached at one end to the seat back and including a free end having a profile matching a profile of the transverse frame member, and a biasing member configured to bias the free end of the brace into contact with the transverse frame member. Prior to a dynamic event sufficient to cause actuator rotational motion, the free end of the brace is disengaged from the transverse frame member. During a dynamic event sufficient to cause actuator rotational motion, the free end of the brace is configured to move into engagement with the transverse frame member to stop rotational motion of the seat back in a rearward direction relative to the seat pan.

In some embodiments, during the dynamic event sufficient to cause rotational motion of the actuator, the seat back is configured to rotate forward relative to the seat pan thereby causing the link to follow along an outer surface of the transverse frame member until the free end of the link is cleared to engage the outer surface of the transverse frame member.

In some embodiments, each of the transverse frame member and the free end of the brace has a rectangular cross-section.

This Brief Summary is provided solely as an introduction to subject matter that is fully described in the Detailed Description and Drawings. This Brief Summary should not be considered to describe essential features nor be used to determine the scope of the Claims. Moreover, it is to be understood that both the foregoing Brief Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

Broadly, the present disclosure provides embodiments of devices for controlling motion of an actuator during a dynamic event such as a high g-force event causing abnormal seat frame motion. During normal use of the seat, the devices allow standard range of motion of the seat, for instance seat back adjustment between an upright sitting position and a reclined sitting position or horizontal bed. During a dynamic event exceeding a predetermined threshold g-force, for instance a 12G or 16G event, movement of seat back forward of TTOL carries with it the coupled actuator causing rotational motion of the actuator. The initial rotational motion, for instance in the forward direction of the seat, readies the devices for action. During rebound of the seat back, for instance in the rearward direction of the seat, the readied devices briefly engage to momentarily stop rotational motion of the actuator such that a majority of load on the actuator is able to pass through the actuator shaft and into the seat frame. After the momentary stoppage of the rotational motion, the devices may or may not remain engaged. As discussed further below, device engagement constrains the actuator such that plastic deformation of the actuator is controlled and/or minimized during a dynamic event.

While device embodiments according to the present disclosure are described with application to an aircraft passenger seat, and particularly utilized in the coupling between the seat pan and the seat back, it is intended and envisioned that the device principles can be applied to other motion control systems wherein a component is subject to loads sufficient to cause unwanted plastic deformation.

FIGS. 2A-D illustrate a motion control device according to an embodiment of the present disclosure. The motion control device 200 is configured to be installed on a passenger seat having a seat back rotationally coupled to a seat pan, such as the seat frame shown in FIGS. 1A-1B. The seat is equipped with an actuator 202 coupled at one end to a frame member 204 located in the seat pan, and at an opposing end to a frame member 206 located in the seat back. The actuator 202 shown is a linear actuator generally including a stepper motor 208 and a shaft 210 in the form of a lead screw. In use, the stepper motor 208 is energized to drive rotation of the lead screw. For example, elongating the actuator 202 causes seat back rotation in the forward direction of the seat corresponding to seat back incline, whereas shortening the actuator 202 causes seat back rotation in the rearward direction of the seat corresponding to seat back recline.

The motion control device 200 generally includes a first part 212 attachable to a frame member located in the seat pan and a second part 214 attachable to the actuator shaft 210. In some embodiments, the first part 212 is attached to the transverse frame member 204 such as the tubular frame member shown. In embodiments, the first part 212 may be implemented as at least one plate 216 defining an attachment location for the first end of the actuator. The at least one plate 216 may further define an opening receiving the transverse frame member 204 therethrough. In embodiments, the at least one plate 216 may further include a mechanical stop 218 for stopping travel of the first end of the actuator shaft 210 in the forward direction of the seat. The first part 212 further includes a first clip 220 configured to interact with a second clip of the second part as discussed further below.

The second part 214 is coupled to the actuator 202 proximate the first end of the actuator. In some embodiments, the second part 214 includes an annular collar 222 positioned around the actuator shaft 210. A portion of the annular collar 222 extends radially outward toward the first part 212. The extension carries or forms a second clip 224 configured to interact with the first clip 220 as discussed further below.

Figure 2A:
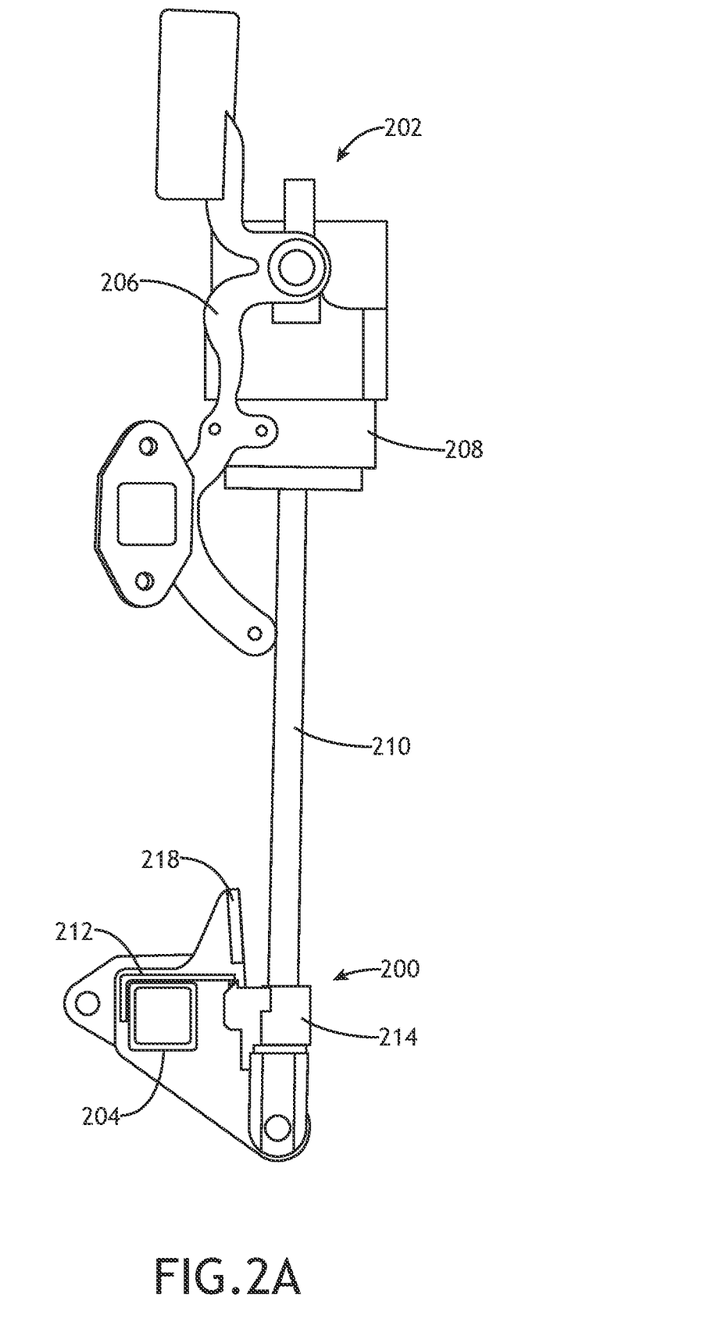
FIGS. 2A-2D illustrate sequential side views of the motion of an actuator constrained with a device in accordance with an embodiment of this disclosure.
Figure 3A:
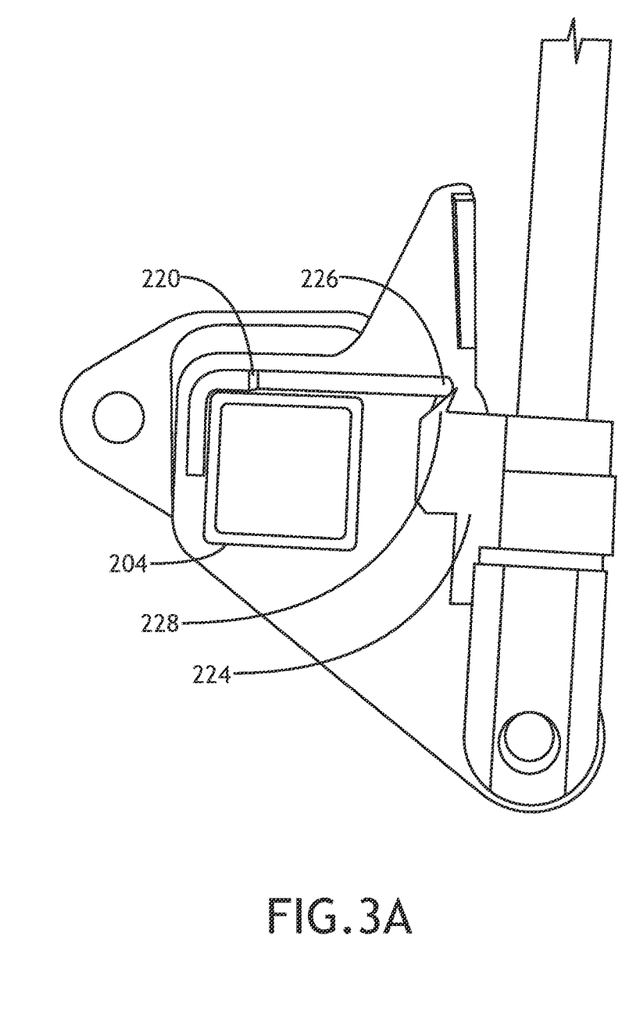
FIGS. 3A-3C illustrate sequential side views of the action of the device shown in FIGS. 2A-2D.

FIGS. 2A and 3A show the motion control device 200 during normal use of the seat (i.e., prior to a dynamic event). During normal use, the first part 212 and the second part 214 are disengaged and do not interact. In embodiments, the first clip 220 includes a first hook 226 and the second clip 224 includes a second hook 228. The first and second hooks 226, 228 face each other and are ramped such that the hooks are able to pass one another to ready the motion control device 200 for engagement as discussed further below. In embodiments, the first clip 220 bends around the transverse frame member 204 for support.

Figure 2B:
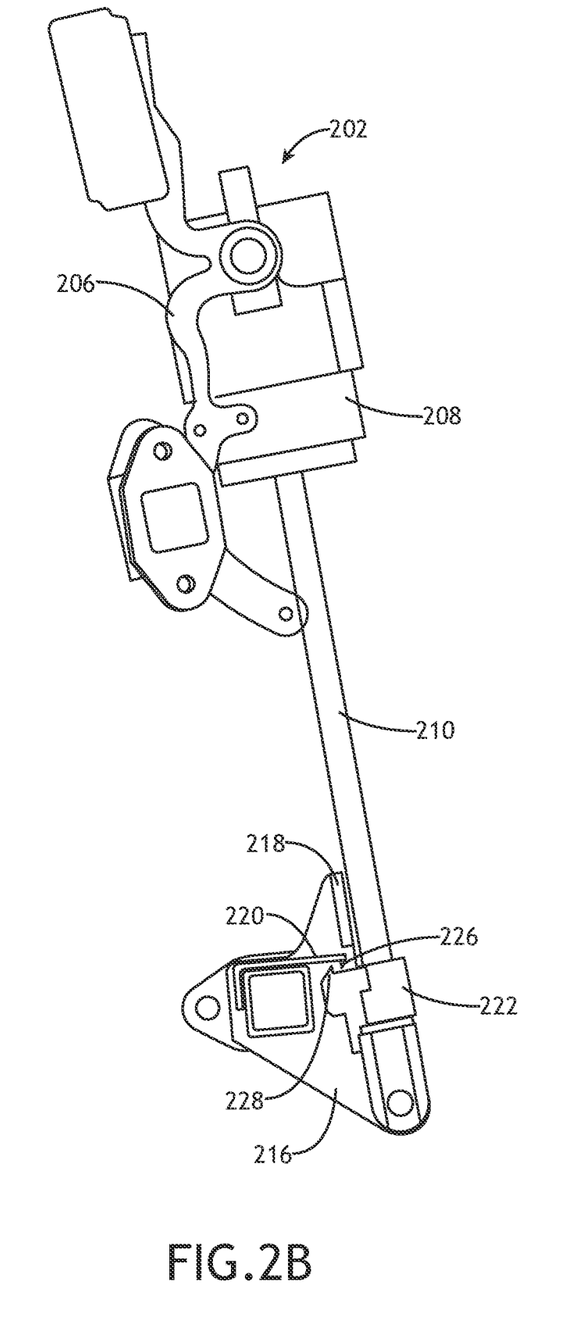

FIG. 2B shows the motion control device 200 readied for engagement. As the seat back rotates forward past the TTOL position in response to a dynamic event of sufficient magnitude threshold, the actuator 202 rotates forward carrying the second part 214 thereby causing the second hook 228 to move past the first hook 226. The actuator rotates forward until the shaft 210 engages the mechanical stop 218. The mechanical stop 218 prevents at least the first end of the shaft 210 from rotating further forward past a predetermined angle. In some embodiments, the seat back and second end of the actuator may continue to rotate forward past the mechanical stop 218 thereby causing the shaft 210 to bend about the mechanical stop. In embodiments, the event threshold is an event sufficient to cause component deformation, for instance actuator shaft deformation. In embodiments, the event threshold may be a 2 g-force event, 3 g-force event, 4 g-force event, 5 g-force event . . . n g-force event.

Figure 2C:
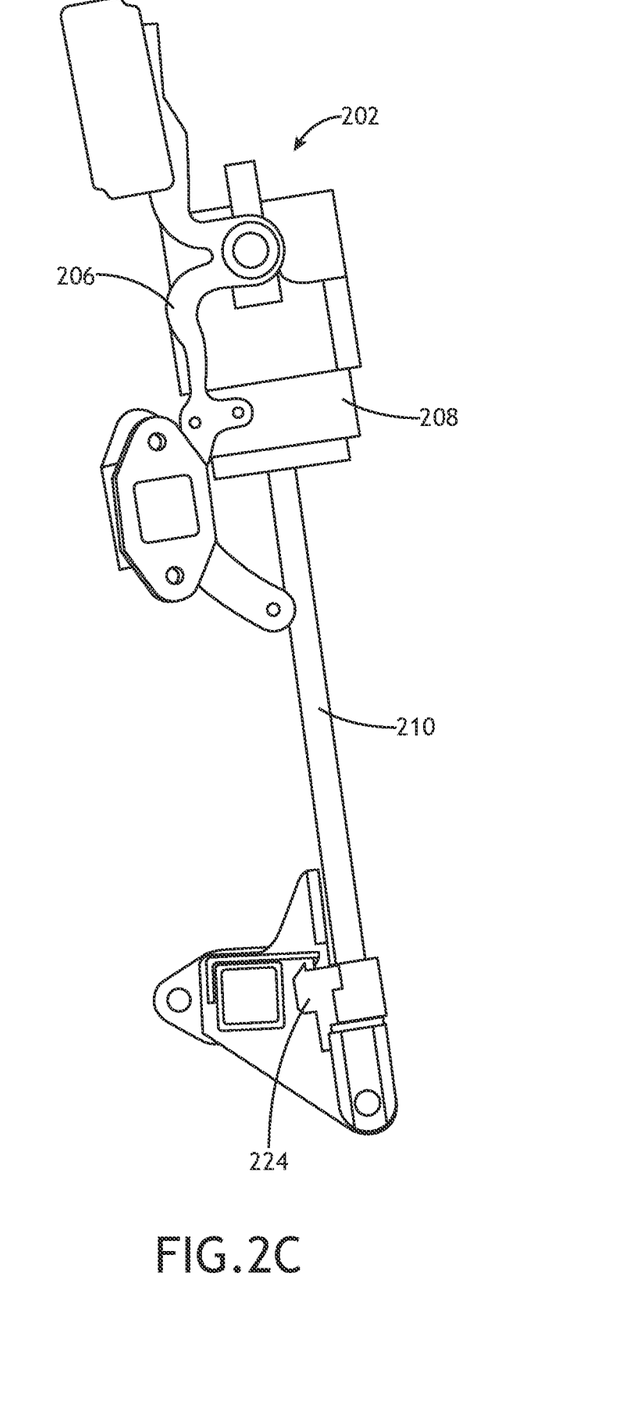
Figure 3B:
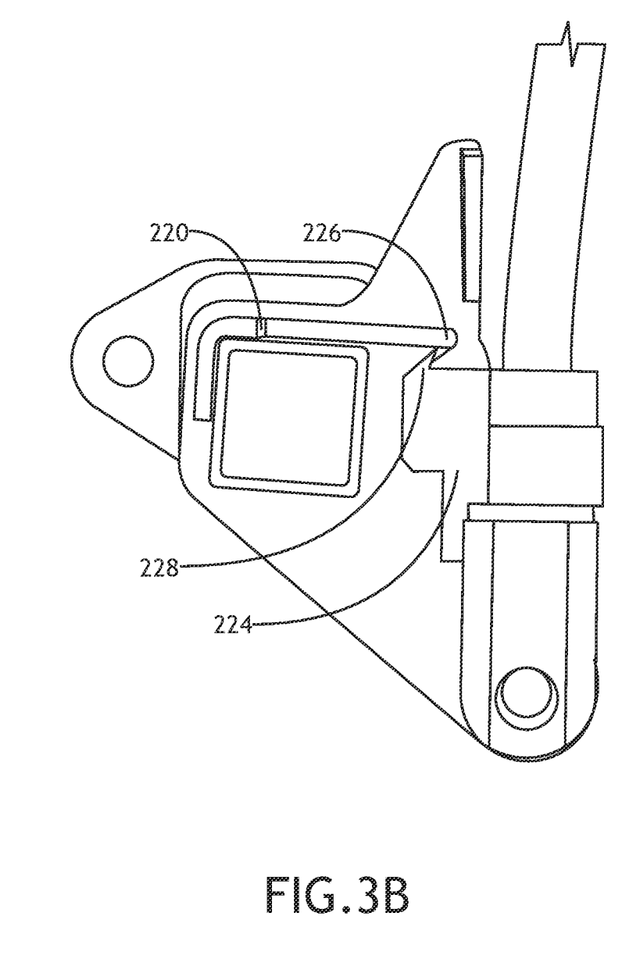

FIGS. 2C and 3B show engagement of the first and second hooks 226, 228 as the seat back rebounds following a transition from rotation in the forward direction to rotation in the rearward direction. The actuator 202 rotates in the rearward direction until the first and second hooks 226, 228 engage. Engagement of the first and second hooks 226, 228 momentarily stops rotation of the actuator 202 in the rearward direction long enough that a majority of load on the actuator 202 passes through the actuator shaft 210 and in the seat frame. In some embodiments, the momentary rotational stop causes the actuator shaft 210 to bend slightly toward a forward direction of the seat (i.e., opposite the bending direction shown in FIG. 1B.

Figure 2D:
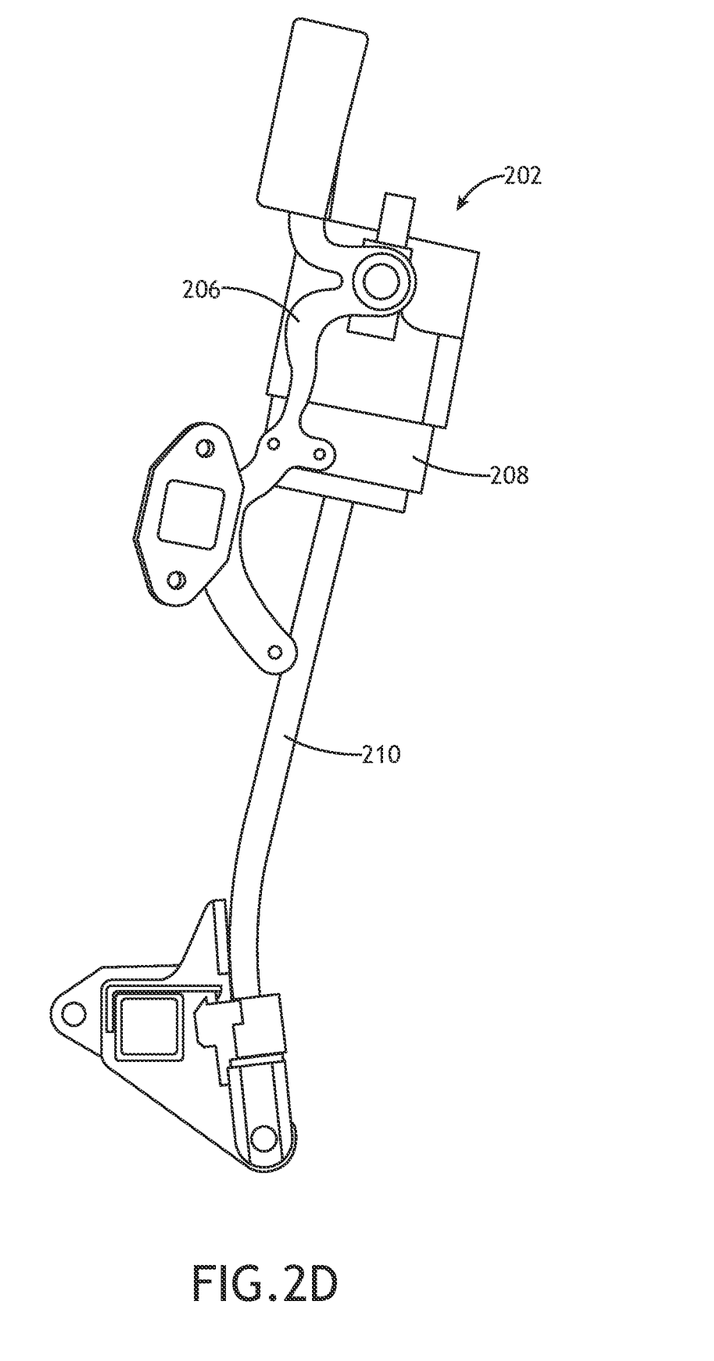
Figure 3C:
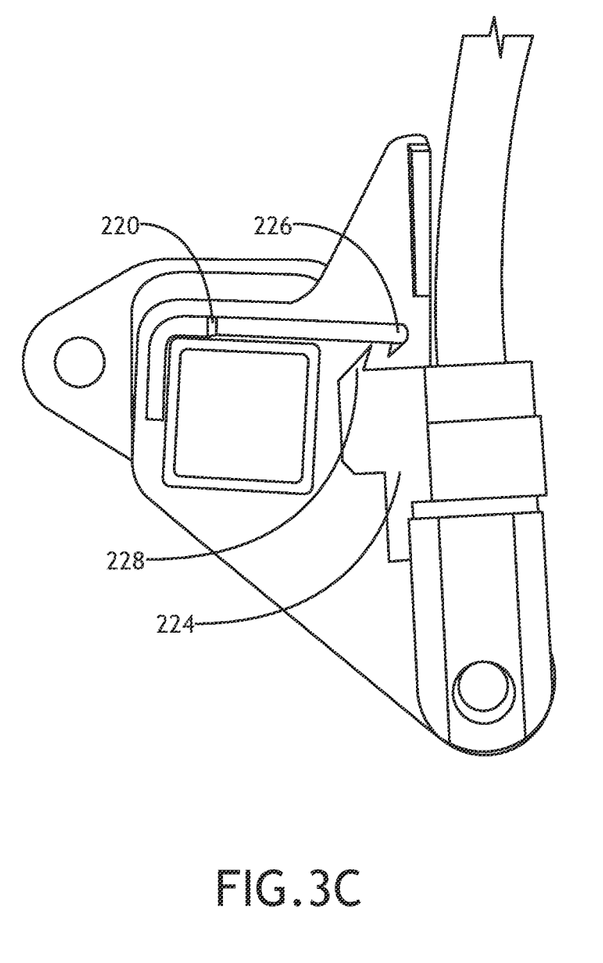

FIGS. 2D and 3C show the disengagement of the first and second hooks 226, 228 after the dynamic event. The first and second hooks 226, 228 interact when the actuator shaft 210 rotates rearward to a certain point but permit the actuator shaft 210 to rotate forward. As the seat back ultimately comes to rest, the first and second hooks 226, 228 may engage to prevent further seat back rotation should the seat frame fail as a result of the dynamic event. In some embodiments, the engagement position of the first and second hooks 226, 228 can be customized to determine the seat back angle following a dynamic event, considering the plastic deformation of the actuator shaft 210. In embodiments, the engagement position of the first and second clips 212, 214, length and/or angle of the mechanical stop 218, and combinations thereof may be customized to control bending in the actuator shaft 210 during a dynamic event.

Figure 4A:
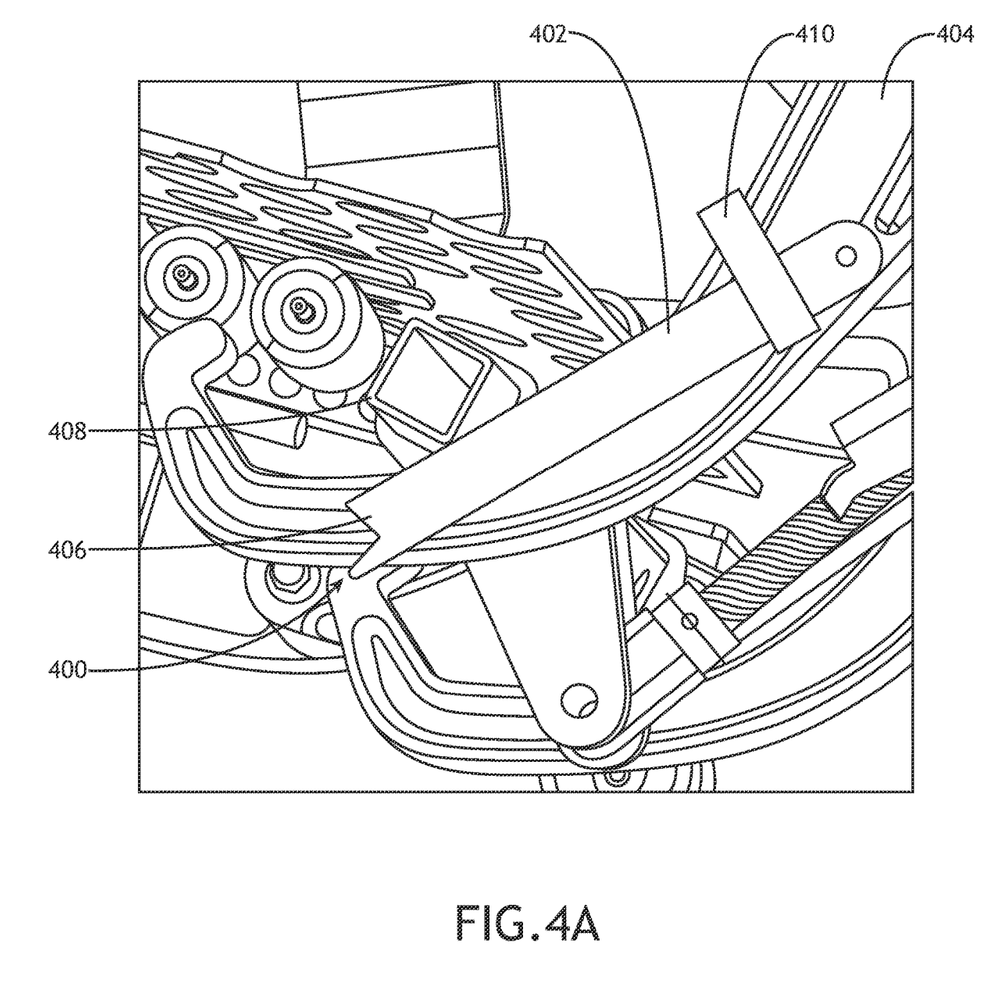
FIGS. 4A-4D illustrate sequential perspective views of the motion of a device for constraining an actuator in accordance with another embodiment of this disclosure.
Figure 4B:
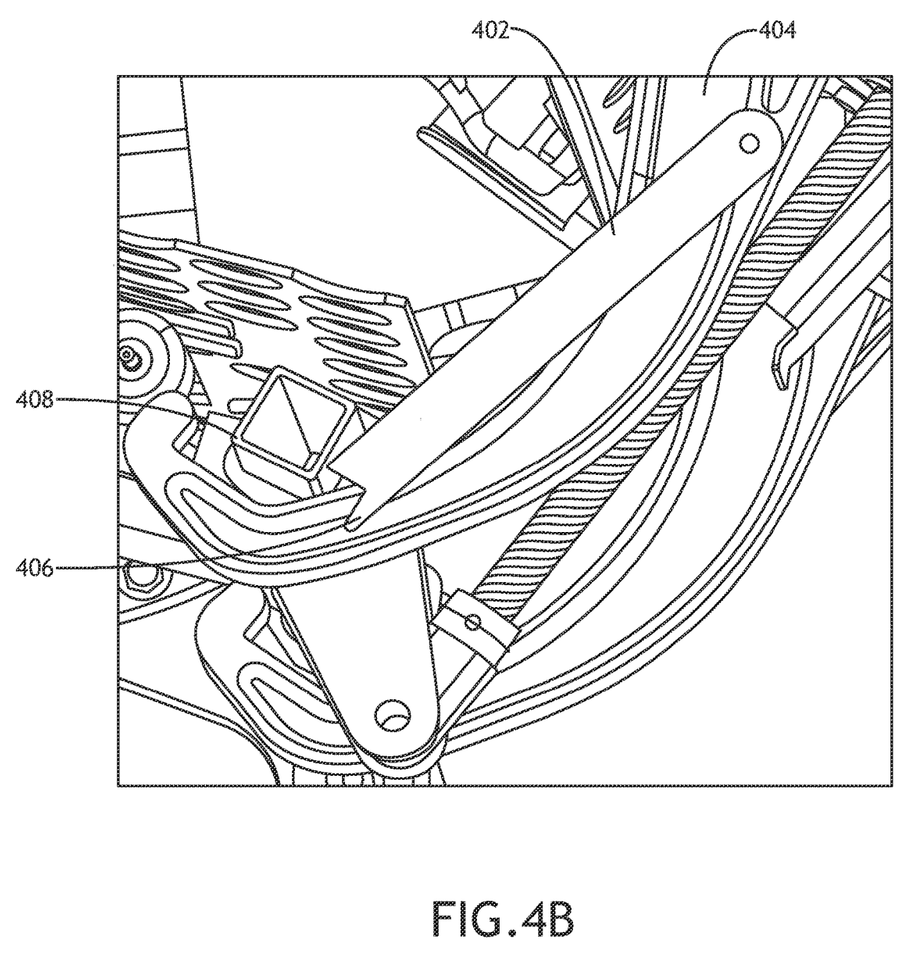

FIGS. 4A and 4B illustrate a motion control device according to another embodiment of the present disclosure. The motion control device 400 generally includes a brace 402 rotatably coupled at one end to a frame member such as a seat back frame member 404. A detached end of the brace shown generally at 406 defines a profile matching a profile of another seat frame member, for instance a seat pan frame member 408. As shown, in a non-limiting example, the seat pan frame member 408 is tubular and has a square cross section and the detached end 406 of the brace 402 has a matching square profile. A biasing member 410, for instance a tension spring, is configured to bias the detached end 406 toward the seat pan frame member 408 such that rotational movement of the seat back causes the brace 402 to drag along the seat pan frame member 408 without losing contact.

Figure 4C:
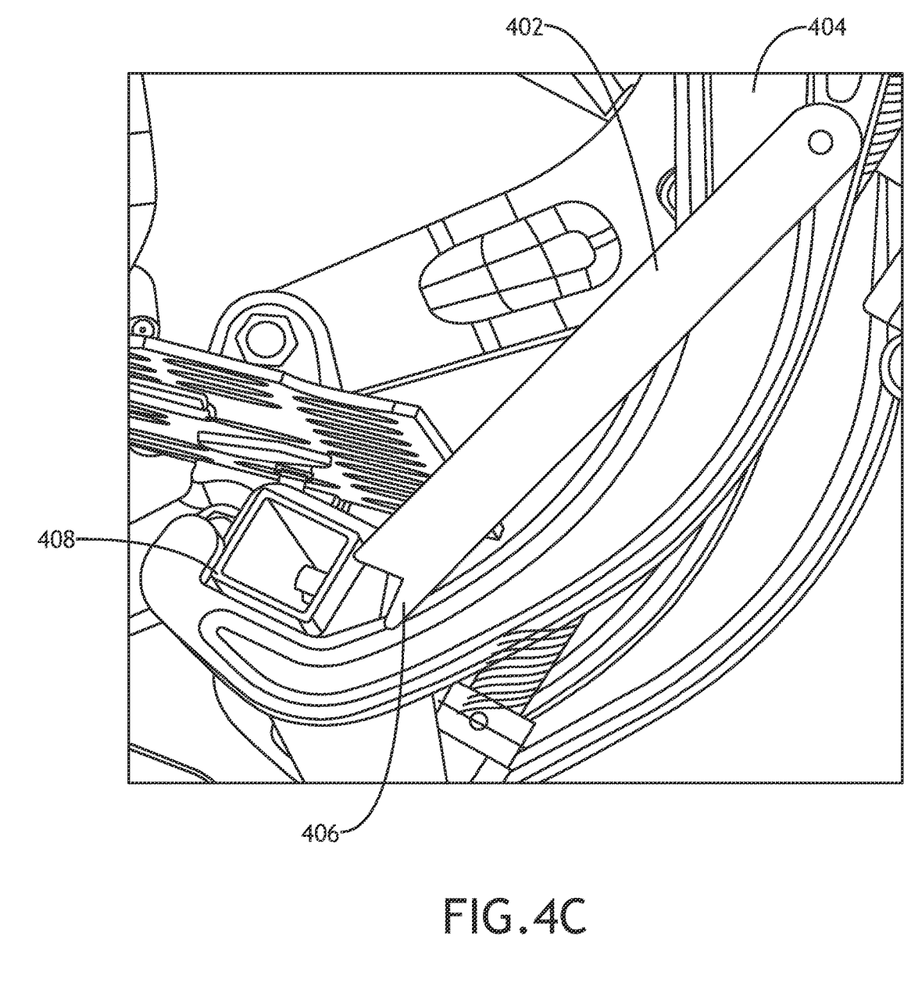
Figure 4D:
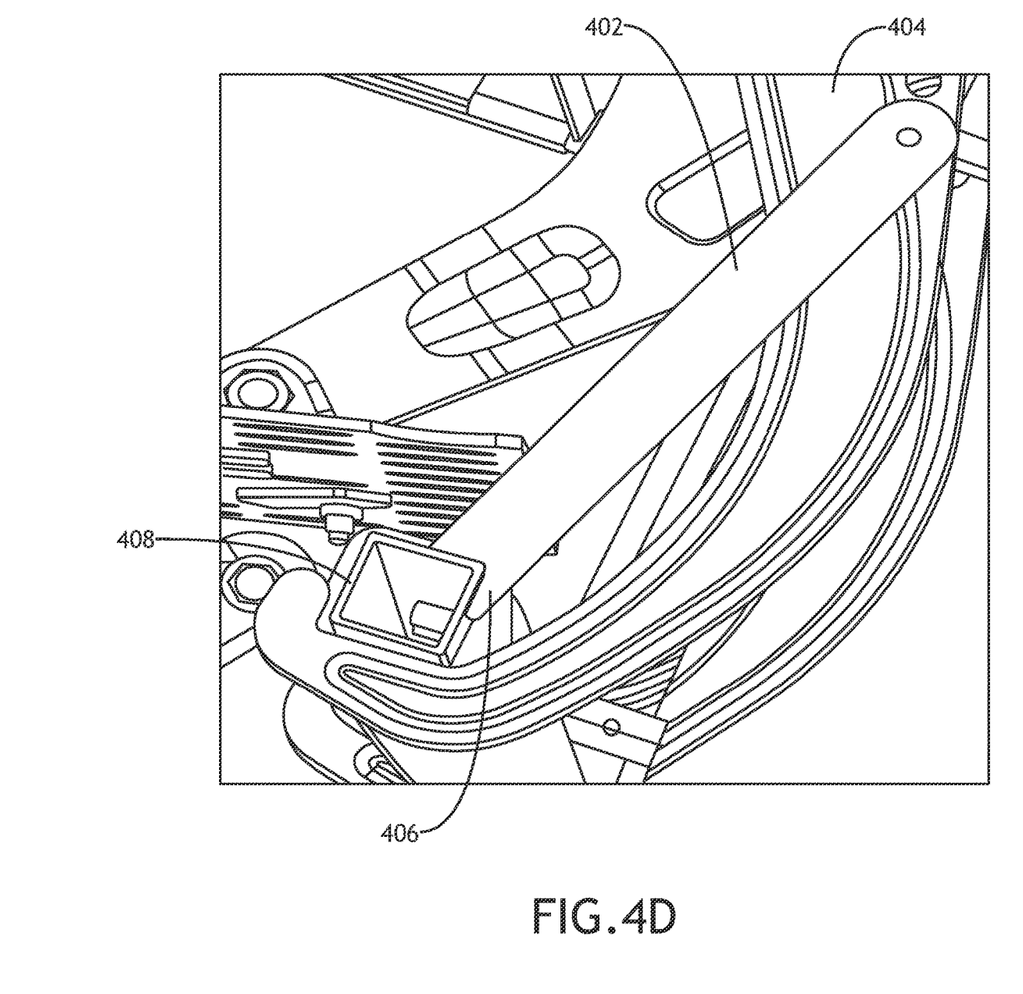

FIG. 4A shows the brace 402 during normal use of the seat (e.g., seat movement between TTOL and reclined). As shown, the free end 406 is disengaged from the seat pan frame member 408. As shown in FIG. 4B, as the seat back rotates forward past the TTOL position as the result of a dynamic event, the brace 402 drags along the outer surface of the seat pan frame member 408. As shown in FIG. 4C, as the seat back continues to rotate forward past TTOL the detached end 406 nears a transition point from detached to engaged. As shown in FIG. 4D, sufficient rotational movement of the seat frame forward of TTOL clears the detached end 406 such that the detached end can move to engage the seat pan frame member 408. When braced, the seat back is prevented from rebounding past a certain angle thereby allowing a majority of the load to pass through the brace 402 and the actuator 202 to the seat frame.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed is:

1. A passenger seat, comprising:
    a seat pan including a transverse frame member;
    a seat back rotationally coupled to the seat pan;
    an actuator coupled at a first end to the seat pan and at a second end to the seat back, the actuator operable to control rotational motion of the seat back relative to the seat pan, and the actuator including a shaft; and
    a device configured to constrain rotational motion of the seat back during a dynamic event, the device comprising:
        a brace pivotally attached at one end to the seat back and including a free end having a profile matching a profile of the transverse frame member; and
        a biasing member configured to bias the free end of the brace toward the transverse frame member;
    wherein, prior to a dynamic event sufficient to cause actuator rotational motion, the free end of the brace is disengaged from the transverse frame member; and
    wherein, during a dynamic event sufficient to cause actuator rotational motion, the free end of the brace is configured to move into engagement with the transverse frame member to stop rotational motion of the seat back in a rearward direction relative to the seat pan.

2. The passenger seat according to claim 1, wherein, during the dynamic event sufficient to cause rotational motion of the actuator, the seat back is configured to rotate forward relative to the seat pan thereby causing the link to follow along an outer surface of the transverse frame member until the free end is clear to engage the outer surface of the transverse frame member.

3. The passenger seat according to claim 1, wherein each of the transverse frame member and the free end of the brace has a rectangular cross-section.

4. The passenger seat according to claim 1, wherein the dynamic event sufficient to cause actuator rotational motion is at least a 12 g-force event.

* * * * *